Patented June 17, 1952

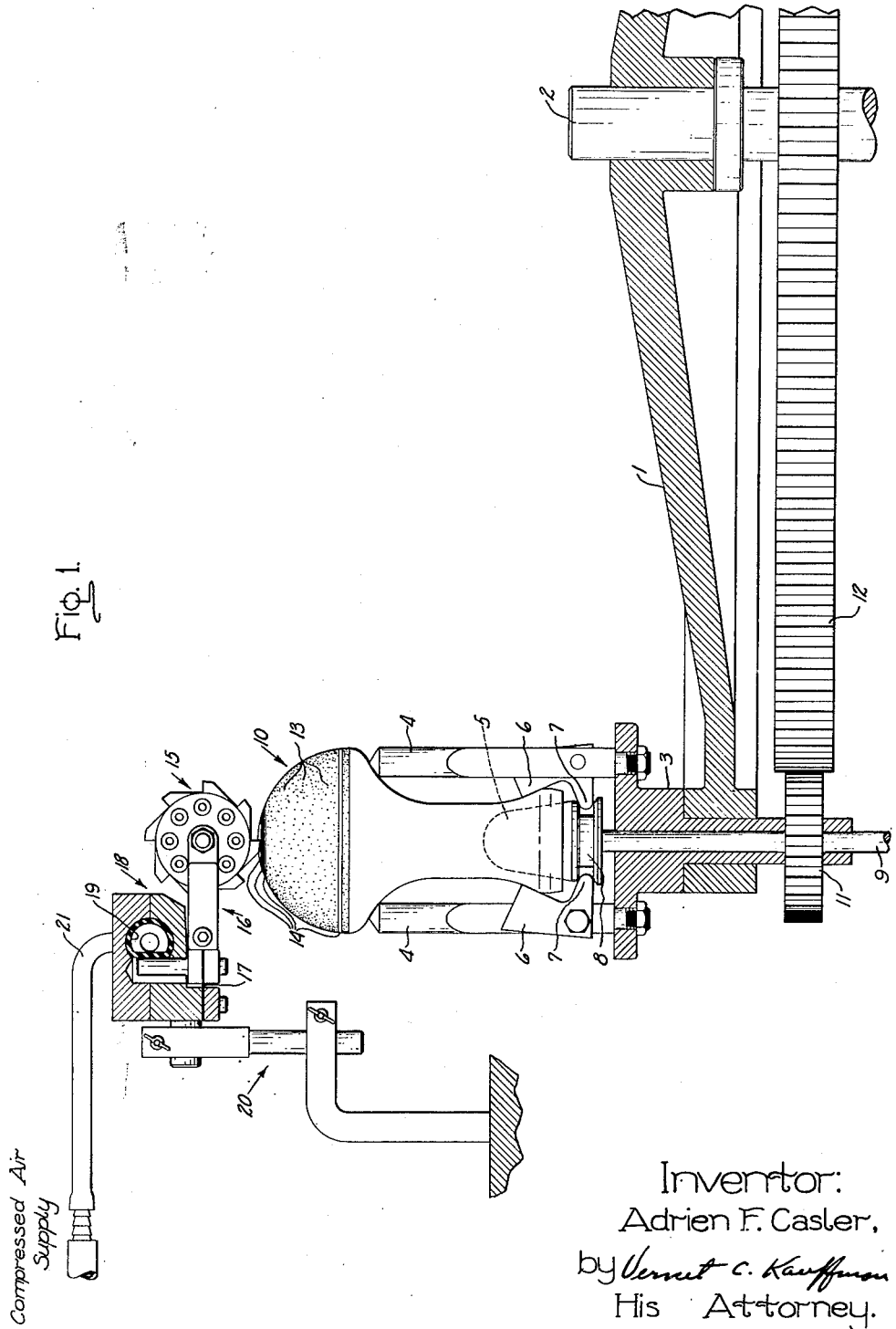

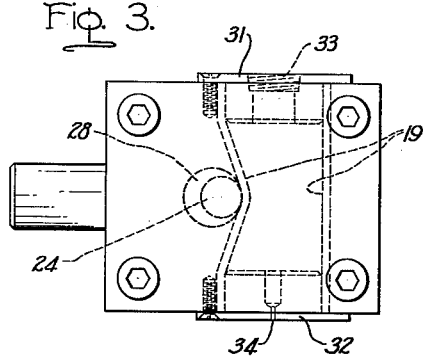
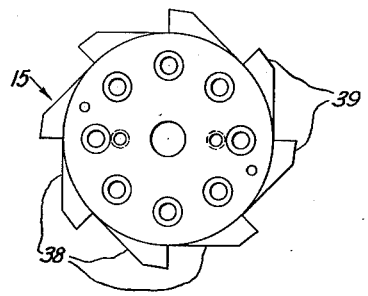
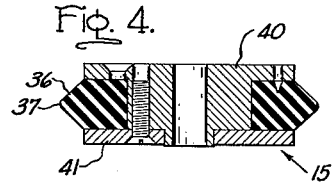
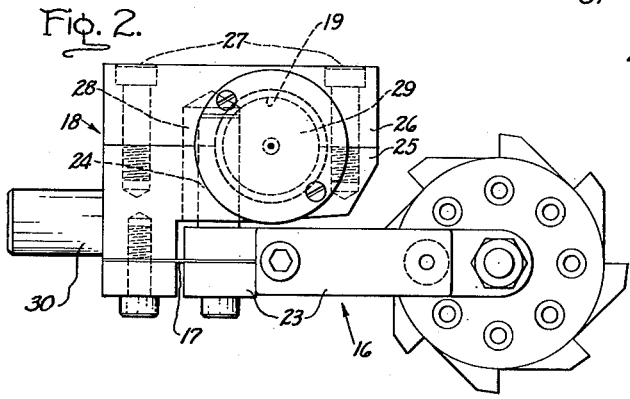
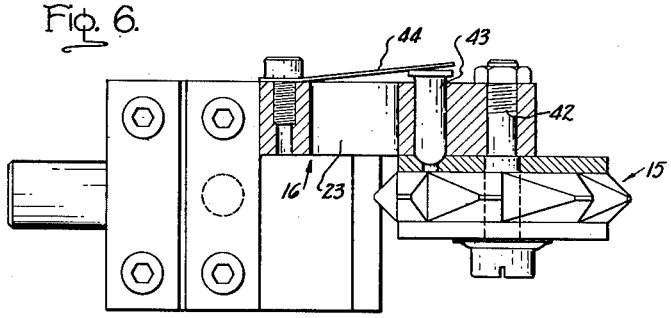

2,600,846

UNITED STATES PATENT OFFICE 2,600,846

MACHINE FOR REMOVING PORTIONS OF THE COATING FROM COATED GLASS ARTICLES

Adrien F. Casler, East Cleveland, Ohio, assignor to General Electric Company, a corporation of New York Application April 21, 1950, Serial No. 157,259

3 Claims. (Cl. 118—102)

This invention relates to a machine for circularly marking glass bulbs and comprising a flexible linkage mechanism of the pneumatic type which is particularly adapted to provide a slow operation of a member, such as a tool, from one position to another, and a relatively fast return to the original position.

The invention is particularly useful in glass and molded article manufacturing and may be utilized in conjunction with machines of the type commonly referred to as rotary turret machines. These generally comprise a rotating platform or turret having a series of heads or chucks, each adapted to receive and hold a work piece such as a glass bulb, lamp, or similar article. The turret is intermittently rotated in order to advance each head or chuck through a series of work positions, the chucks being simultaneously spun or rotated while in these positions. A particular operation is performed on the work piece in each position of the chucks while the turret is stopped thereat, the operation being done by a cutting or scraping or abrading tool which is brought forward to bear against the work piece in that position.

My invention is particularly concerned with a new and improved pneumatic flexible linkage system for advancing or bringing forward a tool against the work piece, such as a glass bulb, under conditions such as described above. Generally, it is necessary that the tool be brought forward relatively slowly against the bulb in order to prevent possible fracture or breakage as might result from the impact of the tool should it descend quickly. Since, of necessity, there must be slight variations in dimensions between different bulbs, a degree of tolerance must be provided in the movement of the tool, and this may be taken care of by providing a certain amount of resiliency in the linkage mechanism. Also, after the operation has been performed upon the bulb, which operation may be either cutting, scraping, or abrading, it is desirable that the tool be removed from the bulb in the shortest possible time in order that the turret may then be stepped or advanced to its next work position without delay.

Accordingly, it is an object of my invention to provide a new and improved linkage mechanism having a slow operation in one direction and a fast operation in the other coupled with a certain amount of resiliency in its movement to compensate for unavoidable dimensional variations between successive work pieces.

A further object of my invention is to provide an improved linkage mechanism particularly adapted for bringing forward a tool to bear against a relatively fragile article without impact and for quickly removing said tool after a predetermined time.

Another object of my invention is to provide a linkage mechanism of the afore-mentioned type which may be readily adjusted to operate at any desired position or angle with reference to a work piece.

In accordance with my invention, I provide a resilient linkage mechanism wherein the desired operation is achieved by means of a fluid under pressure, generally compressed air, which is used to restore a deformable body to its normal shape. A tool is fixed to a support arm, which arm is normally forced forward into the operating position by means of a spring. When in the operating position, a portion of the support arm presses against a closed resilient body which may, for instance, be a short piece of rubber tube, which is transversely deformed by the arm portion. The rubber tube is closed and has a coupling at one end for connection to a supply of compressed air and an escape vent at the other.

To return the tool to its nonoperating position, compressed air is supplied to the rubber tube which thereupon fills out and moves the support arm back against the force of the spring thereby carrying the tool away from the work piece. At the succeeding operation, in order to bring the tool forward slowly, the supply of compressed air is shut off and the charge of air within the tube escapes relatively slowly through the air vent. As the air pressure decreases, the force of the spring causes the projection on the support arm again to deform the tube so that the tool slowly returns to the operating position. The fact that the tool is brought forward by means of a spring provides a certain resiliency in its positioning which compensates for the dimensional tolerances of successive work pieces such as glass bulbs.

For further objects and advantages and for a better understanding of my invention, attention is now directed to the following description and accompanying drawing. The features of my invention believed to be novel will be more particularly pointed out in the appended claim. In the drawings, wherein like reference numerals refer to corresponding elements:

Fig. 1 is a fragmentary view, partly schematic in form, of one head or chuck of a rotary turret machine with a glass bulb mounted in operative position thereon, and illustrating the positioning of a pneumatic linkage mechanism for advancing a scraping cutter against the bulb.

Fig. 2 is a side elevation of a pneumatic linkage mechanism embodying a preferred form of my invention.

Fig. 3 is a plan view of part of the same linkage illustrating the deformation of the rubber tube.

Figs. 4 and 5 are cross sectional and side views, respectively, of a hard rubber scraping cutter which may be used in conjunction with my pneumatic linkage mechanism for cutting circular grooves or rings on the enameled surface of a glass bulb.

Fig. 6 is a plan view, partly in section, of a complete linkage assembly showing in greater detail the mounting of the scraping cutter.

Referring to Fig. 1, the rotary turret machine comprises essentially a circular platform 1 pivotable about a shaft 2. At spaced intervals near the periphery of the platform 1, are located a number of heads or chucks 3 for receiving and holding glass bulbs or similar articles. Head 3 may comprise a number of centering posts 4, a central support core 5 and clamping pieces or jaws 6. The clamping jaws have projecting portions 7 locking into a grooved disc 8, which disc may be moved vertically by means of a rod 9 in order to operate the jaws and lock or release a glass bulb 10. Head 3 may spin with relation to the platform 1 and is linked by means of a planet gear 11 to a sun gear 12 which is fixed to the supporting shaft 2.

The operation of the turret may be summarized briefly as follows: The shaft 2 and the sun gear 12 rotate at a constant speed. Indexing means, not shown in the drawing, are provided for intermittently locking or releasing platform 1 while simultaneously releasing or locking head 3 with respect to platform 1. In the first-mentioned condition, the platform being locked, the head spins or rotates with respect to the platform at a relatively high speed. In the second condition, the head is locked to the platform; and the platform, being free, rotates with the sun gear. Thus, by suitable indexing means, the turret is intermittently rotated in order to advance each head through a series of work positions, and the heads spin while fixed in each individual position.

The drawing in Fig. 1 shows a glass bulb 10 mounted and centered within the head or chuck 3. The upper end or expanded portion of the bulb has previously been coated with an enamel or silica mixture 13, for instance, by a suitable dipping process. It is desired to cut a number of clear, circular rings or grooves 14 by removing the enamel in accordance with the required pattern. This is achieved by means of a hard rubber scraping tool 15 having a relatively blunt edge of suitable size and shape which is brought to bear against the surface of the bulb while it is spinning in the position shown.

The pneumatic linkage, in accordance with my invention, for effecting the required movement of the tool 15 comprises a support arm 16 to which the tool is affixed at one end and which is secured by means of a resilient spring blade 17 to a support block 18. Block 18 holds a short piece 19 of resilient rubber tube so located that a vertical extension of arm 16 bears transversely against it. Block 18 is located with respect to the operating position of the rotary turret by means of a suitable clamping system 20. Tube 19 is connected at one end by means of flexible tubing 21 to a supply of compressed air not shown in the diagram. On the opposite side of rubber tube 19 is a small air vent for allowing air to escape from within the tube.

In the absence of a supply of compressed air to tube 19, spring 17 forces support arm 16 down and the vertical projection thereof collapses the side of the tube. However, as soon as compressed air is supplied to the tube through the tubing 21, it expands and forces the vertical projection to the left thereby causing the support arm 16 to pivot with respect to block 18 so that tool 15 is raised. The tool or scraping cutter 15 is held up in this position whenever the platform 1 rotates the chucks or heads to their successive positions. However, when the platform 1 is stopped in one position and the heads are spinning, the supply of compressed air is cut off so that the accumulated charge of air within the tube 19 slowly escapes through the air vent. It is then possible for spring 17 to cause arm 16 to pivot and once more deform tube 19 so that the scraping cutter is slowly brought down into the operative position.

An actual construction of an embodiment of my invention will now be described in detail in order to illustrate the simplicity and compactness thereof, and also its advantages for the previously mentioned application of marking clear rings or grooves on the enameled surface of a glass bulb. Referring to Figs. 2 and 3, the support arm 16 for the cutter comprises a straight portion 23 and a pin 24 mounted vertically at right angles to the body of the arm and at the left end thereof, this pin constituting the previously mentioned vertical extension. The support block 18 comprises a lower main portion 25 and an upper clamping portion 26, both portions being secured together by suitable means such as machine screws 27. The upper and lower portions of support block 18 are hollowed out to form orthogonal cylindrical cavities 28 and 29 which project slightly into each other's adjoining sides. Pin 24 moves within the first cavity, whereas the short rubber tube 19 is fitted within the second cavity in such manner that its left side bears against the pin 24. Portion 23 of arm 16 is resiliently attached to the block 18 by means of a short blade spring 17 which in its normal position causes a deformation of tube 19 in the manner shown in Fig. 3. A rod-like projection 30 at the left end of block 18 serves as means for clamping the assembly to a suitable support, as shown at 20 in Fig. 1.

Referring more particularly to Fig. 3, it will be observed that tube 19 is closed at both ends by means of circular plates 31 and 32. Plate 31 has a suitable threaded opening 33 for receiving a hose or tubing connection to a compressed air supply, whereas plate 32 has a small vent 34 in the center thereof to permit the escape of air from the tube. Although no means have been shown for controlling the escape of air from the vent 34, it will of course be understood that a suitable needle valve may be provided to regulate said escape and control the rate of movement of the cutter when it returns to its operative or down position.

Referring to Figs. 4 and 5, scraping cutter 15 is formed from a disc of relatively hard, molded rubber or similar composition, of which the rim is formed to a conical shape as shown at 36, with the apex of the conical portion cut off as shown at 37. Right angled portions 38 are cut away from the rim of the disc thereby leaving projecting right angled teeth 39 which serve as the cutting or scraping edges. Cutter 15 is secured to the arm 16 by suitable clamping plates 40 and 41 which are mounted on either side of the cutter.

Referring to Fig. 6, the cutter is secured to the straight portion 23 of support arm 16 by means of a screw 42. The cutter can be rotated on the screw in order to place another cutting or scraping edge into the operative position whenever a previous one becomes worn. An indexing system, comprising a pin 43 and a detent spring 44 permits locking the cutter into any one of eight available positions.

The cutter which has been described has considerable advantages for the present application over a hardened steel knife cutter of more conventional form. In the first place, the cutter 15, being made out of a molded disc, may be accurately formed, and thereafter the individual cutting or scraping teeth sections are likewise accurately dimensioned. The indexing mechanism permits rotation of the disc in order to put the next tooth section into service whenever one has become worn. The use of a hard rubber composition has also been found preferable to metal cutters since the enamel coating which it is desired to scrape off the glass bulb contains a high proportion of silica which would wear steel very quickly, whereas it does not appear to have a like effect on a hard rubber composition.

While a certain specific embodiment has been shown and described, it will, of course, be understood that various modifications may be made without departing from the invention. Thus, the use of the linkage mechanism which has been described in conjunction with the rotary turret machine shown is by way of illustration and is not to be construed as a limitative example. As for the actual linkage mechanism, it is evident that many variations as to size and shape and disposition of the component parts may be made. Thus, other types or shapes of resilient deformable containers may be used in lieu of the cylindrical rubber tube which has been described. The appended claims are, therefore, intended to cover any such modifications coming within the true spirit and scope of the invention.

What I claim as new and desire to secure by Letters Patent of the United States is:

1. In combination with a machine for automatically locating and spinning successive glass bulbs at a work station, a flexible linkage mechanism positioned at said station for bringing forward a scraping tool against said bulb relatively slowly and for removing said tool relatively quickly, comprising a support block, an operating arm carrying said tool, a spring attaching said arm to said block and tending to make said arm pivot in a plane, a cylindrical cavity within said block with its axis normal to said plane, a resilient deformable cylindrical closed container fitted within said cavity, a second cavity within said block projecting slightly into said cylindrical cavity near its mid-point, said arm having a portion entering said second cavity and bearing against the side of said container, thereby causing a partial collapse thereof by the force normally applied by said spring through said arm, a coupling for admitting a supply of compressed air to said container and an air vent for allowing the escape of air therefrom at a controlled rate, said compressed air restoring said container to its undeformed state in order to secure a quick removal of said tool, and the escape of air therefrom causing said container to return to its deformed state and resulting in the slow bringing forward of said tool.

2. In combination with a machine for automatically locating and spinning successive glass bulbs at a work station, a mechanism for making circular markings on said bulb comprising a support block located at said station, an operating arm carrying a scraping tool, a spring attaching said arm to said block and bending to make the arm pivot in a plane whereby to bring said tool into engagement with said bulb, a cylindrical cavity within said block with its axis normal to said plane, a resilient deformable cylindrical closed container fitted within said cavity, a second cavity within said block projecting slightly into said cylindrical cavity, said arm having a portion entering said second cavity and bearing against the side of said container, thereby to deform it through the force normally applied by said spring, means for admitting a supply of compressed air through said container, said compressed air restoring said container to its undeformed state in order to pivot said arm and disengage said tool from the bulb, and an opening in said container for allowing air to escape therefrom at a controlled rate to allow it to return to its deformed state and permit said tool to engage a successive bulb.

3. In combination with a machine for automatically locating and spinning successive glass bulbs at a work station, a mechanism for making circular markings on said bulbs comprising a support block, located at said station, an operating arm carrying a scraping tool, a blade spring attaching said arm to said block and tending to pivot said arm to bring the tool into engagement with the bulb, a cylindrical cavity within said block with its axis substantially normal to the pivotal plane of said arm, a short flexible tube fitted within said cavity, a second cavity within said block projecting slightly into said cylindrical cavity, said arm having a portion entering said second cavity and bearing against the side of said tube and causing a partial collapse thereof as a result of the force applied by said spring therethrough, means for admitting a supply of compressed air to said tube, said compressed air restoring said tube to its undeformed state thereby to pivot said arm and disengage said tool from the bulb, and an opening in said tube allowing the escape of air therefrom at a limited rate to permit it to return to its deformed state in order to return said tool gradually into engagement with a successive bulb at said work station without danger of breaking the bulb.

ADRIEN F. CASLER.

REFERENCES CITED

The following references are of record in the file of this patent:

UNITED STATES PATENTS

| Number | Name | Date |
| --- | --- | --- |
| Re. 9,804 | Mayhew | July 12, 1881 |
| 1,738,481 | Penn | Dec. 3, 1929 |
| 2,450,438 | Miller | Oct. 5, 1948 |